United States Patent [19]

Hanatani et al.

[11] Patent Number: 4,984,154
[45] Date of Patent: Jan. 8, 1991

[54] INSTRUCTION PREFETCHING DEVICE WITH PREDICTION OF A BRANCH DESTINATION ADDRESS

[75] Inventors: Syuichi Hanatani; Masanobu Akagi; Kouemon Nigo; Ritsuo Sugaya; Toshiteru Shibuya, all of Tokyo, Japan

[73] Assignee: NEC Corporation, Tokyo, Japan

[21] Appl. No.: 286,021

[22] Filed: Dec. 19, 1988

Related U.S. Application Data

[63] Continuation-in-part of Ser. No. 552,223, Nov. 16, 1983, abandoned.

[30] Foreign Application Priority Data

| Nov. 17, 1982 | [JP] | Japan | 57-201550 |
| Nov. 17, 1982 | [JP] | Japan | 57-201555 |
| Nov. 17, 1982 | [JP] | Japan | 57-201556 |
| Nov. 17, 1982 | [JP] | Japan | 57-201557 |
| Nov. 17, 1982 | [JP] | Japan | 57-201558 |
| Nov. 17, 1982 | [JP] | Japan | 57-201559 |
| Mar. 29, 1983 | [JP] | Japan | 58-52946 |

[51] Int. Cl.$^5$ .............................................. G06F 9/26
[52] U.S. Cl. .................................................. 364/200
[58] Field of Search ............................... 364/200, 900

[56] References Cited

U.S. PATENT DOCUMENTS

| 3,559,183 | 1/1971 | Sussenguth | 364/200 |
| 3,940,741 | 2/1976 | Horikoshi et al. | 364/200 |
| 4,200,927 | 4/1980 | Hughes et al. | 364/200 |
| 4,370,711 | 1/1983 | Smith | 364/200 |
| 4,430,706 | 2/1984 | Sand | 364/200 |
| 4,435,756 | 3/1984 | Potash | 364/200 |
| 4,471,433 | 9/1984 | Matsumoto et al. | 364/200 |
| 4,477,872 | 10/1984 | Losq et al. | 364/200 |

Primary Examiner—David L. Clark
Attorney, Agent, or Firm—Sughrue, Mion, Zinn, Macpeak & Seas

[57] ABSTRACT

An instruction prefetching device of a data processing system prefetches an instruction sequence, usually before decoding of a branch instruction being prefetched, by predicting a branch destination address which is preliminarily stored in a branch history table (46) and retrieved by an instruction address of the branch instruction. Preferably, a prediction evaluating circuit (66) evaluates the predicted destination address with attention directed to a result which is obtained by actually executing the branch instruction and indicates whether the branch instruction indicates "no go" or "go" to the branch. When the prediction is incorrect, the prefetch is suspended. Furthermore, the branch destination address is renewed to a new address obtained by decoding of the branch instruction. More preferably, a discriminator (73) discriminates whether or not the instruction being prefetched is really a branch instruction. If not, the predicted destination address is neglected.

8 Claims, 13 Drawing Sheets

INSTRUCTION PREFETCHING DEVICE WITH PREDICTION OF A BRANCH DESTINATION ADDRESS

This application is a continuation-in-part of application Ser. No. 552,223 filed Nov. 16, 1983 now abandoned.

BACKGROUND OF THE INVENTION

This invention relates to an instruction prefetching device for use in a data or information processing system.

An instruction prefetching device is for use in prefetching an instruction sequence. In a prior art instruction prefetching device, a loss cycle is inevitable when a branch instruction appears in the instruction sequence.

An improved instruction prefetching device is disclosed in U.S. patent application Ser. No. 198,990 filed Oct. 21, 1980, by James Edward Smith. According to Unexamined Publication No. 57-76638 of the corresponding Japanese patent application filed by Control Data Corporation, the assignee of the Smith application, prefetch of the instruction sequence is carried out upon appearance of a branch instruction by predicting a branch destination or target based on prior results of execution of the branch instruction in question. When the prediction is correct, the prefetch proceeds without the loss cycle. The loss cycle, however, is three machine cycles long when the prediction fails. As will later be described herein, the loss cycle amounts to about two machine cycles long on the average.

An instruction prefetching device based on a different principle is disclosed in commonly assigned U.S. patent application Ser. No. 415,709 filed Sept. 7, 1982, now U.S. Pat. No. 4,604,691, by Masanobu Akagi, one of the present applicants. The corresponding Japanese patent application filed by NEC Corporation, the assignee, has been published as Unexamined Publication No. 57-59253. The device includes an instruction cache memory which comprises a plurality of instruction blocks for holding copies of a portion of an instruction area of a main memory. A branch information memory comprises a plurality of information blocks which correspond to the respective instruction blocks. When a branch instruction is held in one of the instruction blocks the corresponding information block is loaded with a result of any execution which has ever been carried out on the branch instruction. Another information block is loaded with an address of an instruction block. The last-mentioned instruction block holds an instruction which should very likely be prefetched next subsequent to the branch instruction. An access to the first-mentioned instruction block simultaneously to the corresponding information block is followed by an access to the other information block. An instruction sequence is prefetched at a considerably high speed. The device is, however, capable of attaining only a low accuracy of prefetch due to the prediction by block-to-block correspondence when two or more branch instructions are held in an instruction block.

SUMMARY OF THE INVENTION

It is therefore a general object of the present invention to provide an instruction prefetching device operable with only a short average loss cycle upon appearance of each branch instruction in an instruction sequence being prefetched.

It is a specific object of this invention to provide an instruction prefetching device of the type described, by which it is possible to reduce the average loss cycle to only a little longer than one machine cycle.

It is another specific object of this invention to provide an instruction prefetching device of the type described, which is capable of accurately prefetching an instruction sequence.

Other objects of this invention will become clear as the description proceeds.

According to this invention, there is provided an instruction prefetching device for use in carrying out prefetch of an instruction sequence in a data processing system which includes an executing unit. The instruction prefetching device comprises a branch history table for memorizing a plurality of entry pairs. Each entry pair comprises a first entry specifying an instruction address of a branch instruction executed by the executing unit prior to the prefetch and a second entry specifying branch information which comprises a branch destination address obtained by execution of the branch instruction. The second entry corresponds to the first entry as regards each branch instruction. The instruction prefetching device searches the branch history table for one of the first entries of the entry pairs in response to a current instruction address of a current instruction being prefetched to make the branch history table produce a corresponding second entry, and carries out the prefetching in response to the corresponding second entry.

DESCRIPTION OF THE PREFERRED EMBODIMENTS

Figure 1:
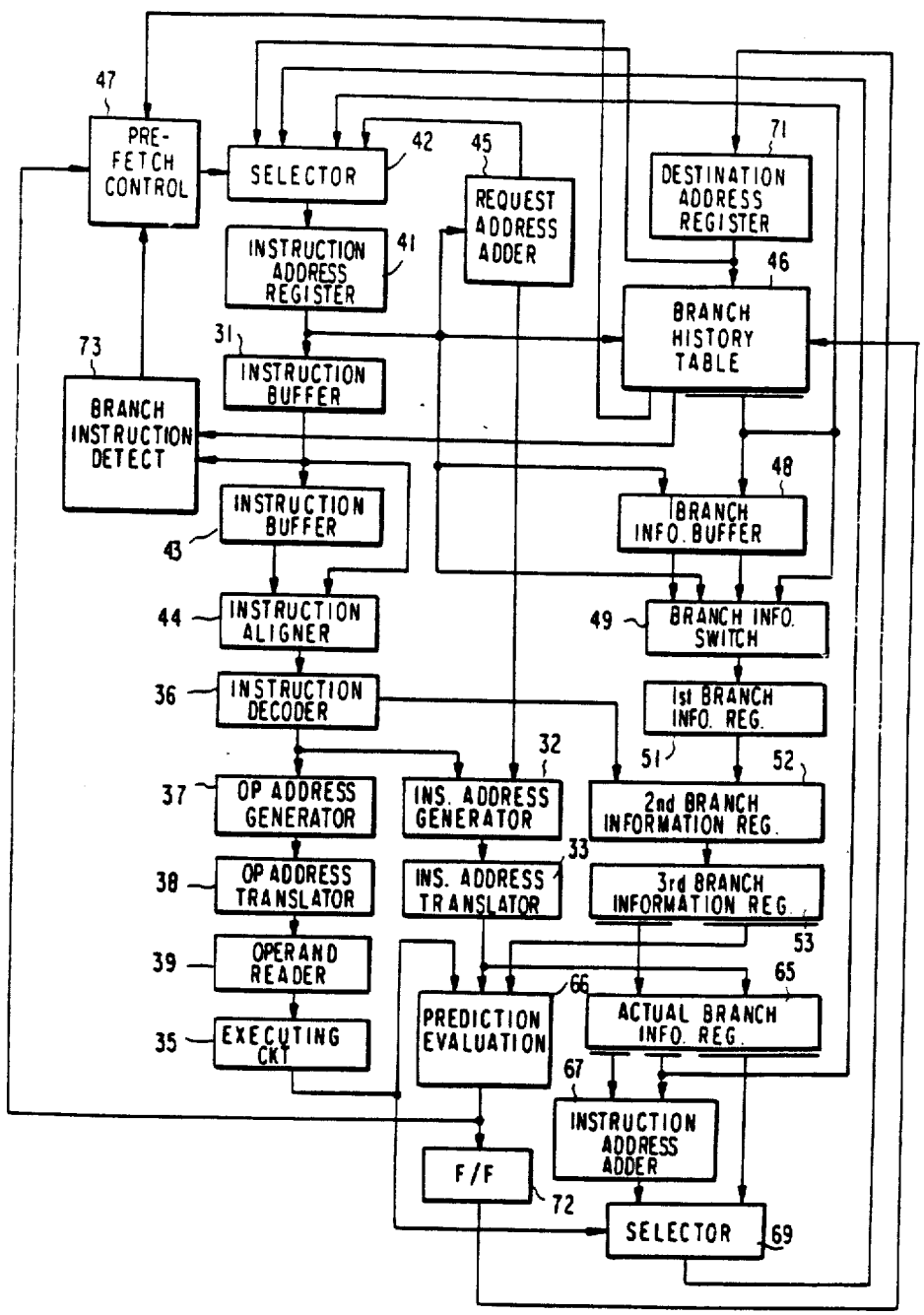
FIG. 1 is a block diagram of a data processing system comprising an instruction prefetching device according to an embodiment of the instant invention.

Referring to FIG. 1, a data or information processing system comprises an instruction prefetching device according to an embodiment of the present invention. Before describing the instruction prefetching device, an example of the data processing system will be described in order to facilitate an understanding of this invention.

It is known in the art that a data processing system is divisible into a plurality of units, e.g., an instruction memory unit 31, an instruction address generating circuit 32, an instruction address translation circuit 33, an instruction executing circuit 35, an instruction decoding circuit 36, an operand address generating unit 37, an operand address translating unit 38, and an operand reading unit 39. The instruction memory unit 31 is for storing a plurality of instructions. The operand reading unit 39 includes an operand memory (not shown). The combination of the instruction address generating circuit 32, the instruction address translating circuit 33, the instruction executing circuit 35 and the instruction decoding circuit 36, is often called an instruction executing unit.

The data processing system may comprise a main memory common to the instruction memory unit 31 and the operand memory of the operand reading unit 39. Address generating and translating units may be used in common to the instruction address generating circuit 32 and the operand address generating unit 37 and to the instruction address translating circuit 33 and the operand address translating unit 38.

The data processing system may comprise several resources. By way of example, the instruction memory unit 31 and the operand memory may comprise instruction and operand cache memories. Each cache memory holds a copy of a portion of the instruction memory unit 31 and the operand memory. Each of the instruction address translating circuit 35 and the operating address translating unit 38 may comprise an address translating buffer. If necessary, reference should be had to either U.S. patent application Ser. No. 214,932 filed Dec. 10, 1980, by Masato Saito, or Unexamined Publication Number 57-87282 of the basic Japanese patent application filed by NEC Corporation, as regards the instruction and the operand cache memories and with regard to instruction address translating circuit 33 and the operand address translating unit 38.

Figure 2:
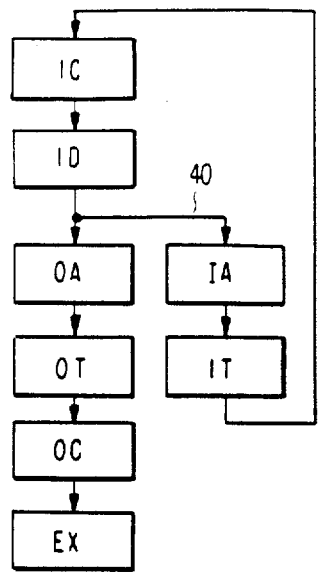
FIG. 2 is a diagram for use in describing the operation of the data processing system illustrated in FIG. 1.

Referring to FIG. 2, it is possible to consider each instruction as being executed generally in the following eight stages:

(1) IA stage: The instruction address generating circuit 32 generates an instruction address (a logical address) of an instruction to be executed;

(2) IT stage: The instruction address translating circuit 33 translates the instruction address to a real address;

(3) IC stage: The real address is used in reading the instruction from the instruction memory unit 31 or preferably from the instruction cache memory;

(4) ID stage: The instruction decoding circuit 36 decodes the instruction to provide a decoding result;

(5) OA stage: Responsive to the decoding result, the operand address generating unit 37 generates the operand address (a logical address) of an operand;

(6) OT stage: The operand address translating unit 38 translates the operand address to a real address;

(7) OC stage: Responsive to the real address of the operand, the operand reading unit 39 produces the operand; and (8) EX stage: The instruction executing circuit 35 executes the instruction.

Use of the above-described resources makes it possible to process the IT and the OT stages and the IC and the OC stages at a high speed. Furthermore, the data processing system is able to execute a sequence of instructions in an eight-stage pipeline.

Figure 3:
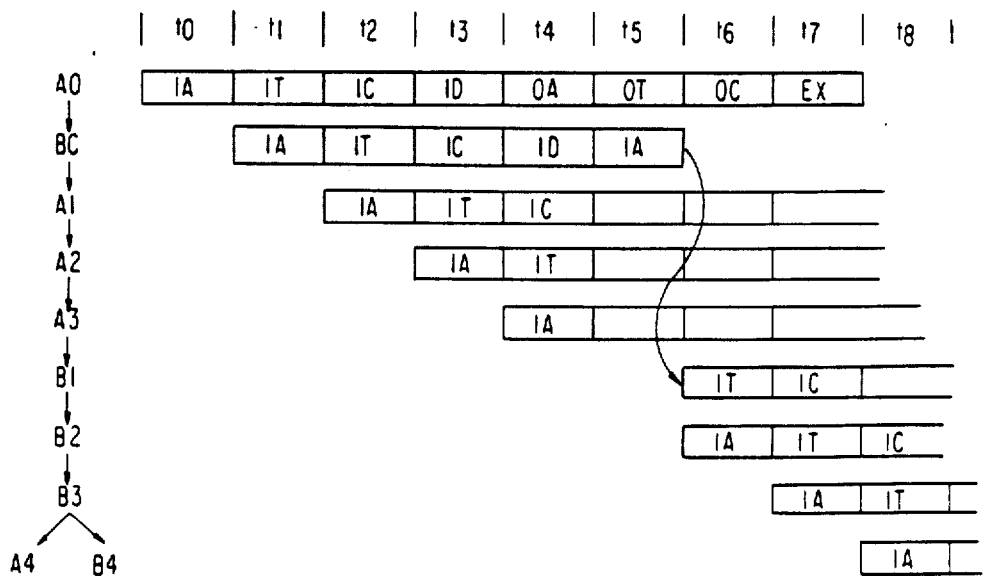
FIG. 3 is a diagram for use in describing the operation of a prior art instruction prefetching device.

Referring to FIG. 3, it will be assumed that the data processing system executes a sequence of instructions A0, BC, A1, A2, A3, A4, . . . , B1, B2, B3, B4, . . . . In the instruction sequence, a branch condition instruction A0 is immediately followed by a branch instruction BC. In compliance with a branch condition which becomes evident by execution of the branch condition instruction A0, the branch instruction BC indicates either of two branch directions, in which a stream of execution of the instruction sequence proceeds to a first partial sequence of instruction A1 and so forth and to a second partial sequence of instructions B1 and so on, respectively. It is to be noted here that the first partial sequence next follows the branch instruction BC and that the second partial sequence follows the first partial sequence. The second partial sequence may alternatively be called a branch.

When the branch condition indicates "no go" to the branch, the first partial sequence is prefetched prior to prefetch of the second partial sequence. When the branch condition indicates "go" to the branch, the second partial sequence is prefetched before the first partial sequence. The first partial sequence is said to be on a "no go" to branch side, and the second partial sequence is said to be, on a "go" to branch side. The instruction A1 or B1 which stands foremost in each partial sequence is called a branch destination or target instruction depending on the branch condition.

It will now be presumed that the eight above-described stages IA through EX are dealt with under the eight-stage pipeline control for the instruction sequence being illustrated. If the IA through EX stages are carried out for the branch condition instruction A0 at zero through seventh instants $t_0$, $t_1$, $t_2$, $t_3$, $t_4$, $t_5$, $t_6$, and $t_7$, respectively, the IA through the ID stages are carried out for the branch instruction BC at the first through the fourth instants $t_1$ to $t_4$, respectively.

According to prior art, such an instruction sequence is prefetched with a branch prediction, or presumption, that the branch condition always indicates "go" to the branch. In this event, the prediction for the "go" to branch side becomes known when the branch instruction BC is decoded at the fourth instant $t_4$. In the meantime, the IA stage is carried out at the second through the fourth instants $t_2$ to $t_4$ for prefetch of those three instructions A1 through A3, respectively, which are on the "no go" to branch side.

As indicted in FIG. 2 by a line 40 with an arrowhead, the ID stage is carried out at the fourth instant $t_4$ on the branch instruction BC, and is followed by the IA stage carried out thereon at the fifth instant $t_5$ to give an instruction address of the branch destination instruction B1 in compliance with the prediction for "go" to the branch. The instruction address of a branch destination instruction on either of the "no go" to branch and the "go" to branch sides is herein called a branch destination or target address.

The IA stage is carried out at the sixth and the seventh instants $t_6$ and $t_7$ for prefetch of &hose two more instructions B2 and B3, respectively, which are on the "go" to branch side. At the seventh instant $t_7$, the branch condition is rendered evident as a result of the EX stage of the branch condition instruction AO as described earlier herein. It is now possible to ascertain whether the prediction for the "go" to branch side has really been correct or incorrect. If the prediction is correct or successful, the instructions A1 and so forth are prefetched. At an eighth instant $t_8$ and thereafter, the instruction sequence is prefetched along a proper or pertinent stream either for the instruction A4 or for the instruction B4.

The branch prediction may always be to the "no go" to branch side rather than towards the "go" to branch side as has thus far been described. In either event, a loss cycle of three machine cycles is unavoidable irrespective of correctness and failure of the prediction whenever a branch instruction appears in the instruction sequence.

Figure 4:
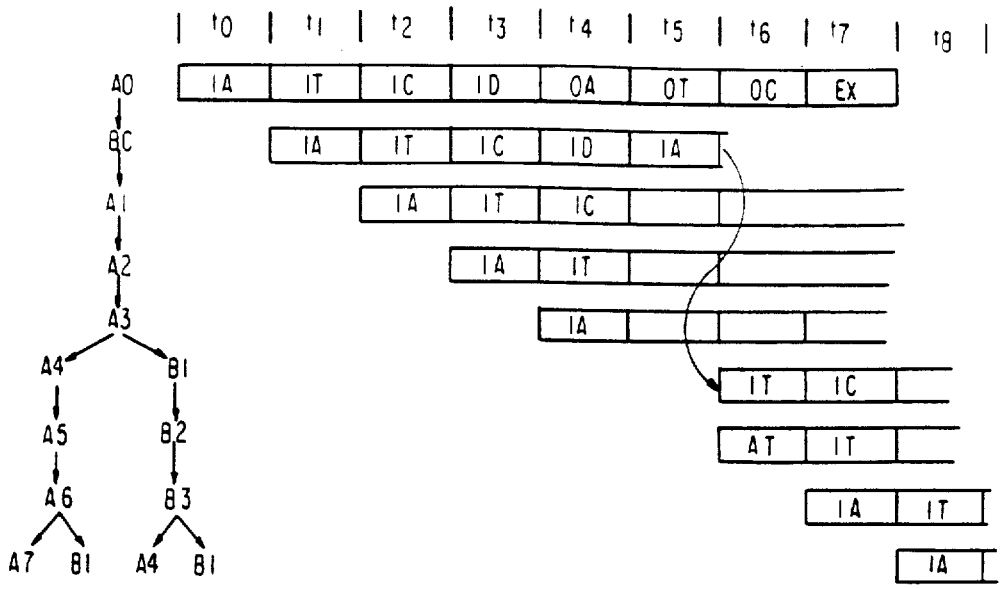
FIG. 4 is a diagram for use in describing the operation of an improved prior art instruction prefetching device.

Turning to FIG. 4, an instruction sequence of the type illustrated is prefetched as follows by an improved instruction prefetching device disclosed in the above-cited Smith patent application. According to the above-referenced Unexamined Publication No. 57-76638, prediction is carried out for each branch instruction by reference to a branch pointer flag indicative of either the "no go" to branch or the "go" to branch sides based on prior results of execution of the branch instruction in question.

As described before in conjunction with FIG. 3, the IA stage is carried out at the zeroth through the fourth instants $t_0$ to $t_4$ for prefetch of the branch condition instruction AO, the branch instruction BC. and the three instructions A1 through A3 on the "no go" to branch side, respectively. Concurrently with the IA stage for the instruction A3, the ID stage is carried out for the branch instruction BC at the fourth instant $t_4$. A decision is thereby given as to whether the process should proceed to the "no go" to branch side or to the "go" to branch side. Depending on the decision, the IA stage is carried out at the fifth through the seventh instants $t_5$ to $t_7$ either for prefetch of three instructions A4, A5, and A6 on the "no go" to branch side or for prefetch of three instructions B1, B2 and B3 on the "go" to branch side. The branch condition becomes evident at the seventh instant $t_7$ as a result of execution of the branch condition instruction AO.

If the "no go" to branch side is predicted at the fourth instant $t_4$ and the prediction is found to be correct at the seventh instant $t_7$, the IA stage is carried out at the eighth instant $t_8$ for prefetch of the instruction A7 which next follows on the "no go" to branch side. If the prediction of "no go" to the branch side turns out to be wrong the IA stage is carried out at the eight instant $t_8$ for prefetch of the foremost instruction B1 on the "go" to branch side. If the prediction is "go" to the branch and is correct, the IA stage is carried out at the eighth instant $t_8$ for prefetch of the instruction B4 which next follows the instruction B3 on the "go" to branch side. If the prediction is "go" to the branch and is incorrect, the IA stage is carried out at the eighth instant $t_8$ for prefetch of the instruction A4 which is next subsequent to the instruction A3 on the "no go" to branch side. At any rate, the instruction sequence is prefetched along a proper stream at the eighth instant $t_8$ and later.

The loss cycle is three cycles long if the prediction is "go" to the branch and is either correct or incorrect, the loss cycle is nil if the prediction is "no go" to the branch and is correct, and the loss cycle is six cycles long if the prediction is "no go" to the branch and is incorrect. A degree $\alpha$ of the correctness of the prediction, i.e., the probability that the prediction is correct is appreciably high because the prediction is based on prior results. It has been confirmed that the degree $\alpha$ is about 0.8. It is possible to assume that "go" to the branch and "no go" to the branch occur at a ratio of fifty-fifty. In other words, each of "go" to the branch and "no go" to the branch occurs at a probability $\gamma$ of 0.5. Under these circumstances an average loss cycle of:

$$3\cdot\gamma + \cdot\alpha + 0\cdot(1-\gamma)\cdot\alpha + 3\cdot\gamma\cdot(-\alpha) + 6\cdot(1-\gamma)\cdot(1-\gamma)$$
$$= 2.1 \text{ (cycles)}$$

is inevitable upon appearance of each branch instruction.

Referring back to FIG. 1, the data processing system comprises an instruction address register 41 in which request addresses are set one at a time as a current request address IAR through a request address selector 42 as will later be described in detail. Accessed by the current request address the instruction memory unit 31 produces a block of an instruction word as a current instruction. It will be assumed merely for convenience of description that the instruction word produced in response to each request is eight bytes long.

Figure 5:
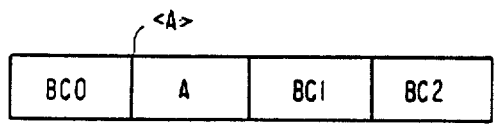
FIG. 5 shows an instruction word.

Turning to FIG. 5, an instruction word usually consists of a plurality of instructions. The illustrated instruction word consists of four two-byte instructions BC0, A, BC1, and BC2. As will presently become clear, the instructions may have different instruction word lengths.

Turning back to FIG. 1, the instruction words are successively read out of the instruction memory unit 31 and are temporarily stored as a queue in an instruction buffer 43. An instruction aligner 44 is for delivering the instruction words one by one from the instruction buffer 43 to the instruction decoding circuit 36. Only when the instruction buffer 43 is empty, the instruction aligner 44 supplies the instruction decoding circuit 36 with the instruction word currently read out of the instruction memory unit 31.

A request address adder 45 is for adding eight to the current request address supplied from the instruction address register 41 to provide a next request address. When selected by the request address selector 42 as will later be described, the next request address is substituted as a new current request address in the instruction address register 31 for the previous current request address so as to prefetch a next subsequent instruction word from the instruction memory unit 31 as a new current instruction.

The instruction prefetching device comprises a branch history table 46. As will shortly be described in detail, the branch history table 46 is addressed by the current request address supplied from the instruction address register 41 to produce branch information in general if the instruction word currently read out of the instruction memory unit 31 comprises a branch instruction.

Figure 6:
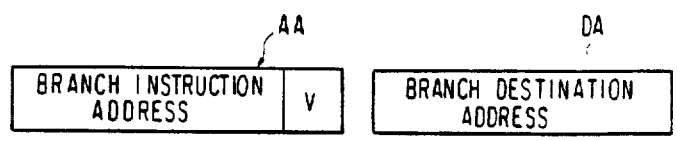
FIG. 6 shows a pair of entries in a branch history table used in the instruction prefetching device illustrated in FIG. 1.

Turning to FIG. 6, the branch history table 46 is for memorizing a plurality of entry pairs. Each entry pair consists of a first or address entry AA and a second or data entry DA for each branch instruction which has ever been executed. The first and the second entries of each pair therefore correspond to each other. The first entry is address information which specifies an instruction address of the branch instruction under consideration as a branch instruction address. The second entry is the above-mentioned branch information and comprises a branch destination address if one has ever been obtained by execution of the branch instruction in question.

When the current request address comprises a branch instruction address specified by one of the first entries, the branch history table 46 produces the branch information of the corresponding second entry as will later be described in detail. The second entry produced from the branch history table 46 specifies a branch destination address as a predicted branch destination address. When the current request address comprises a branch instruction address specified by none of the first entries, the current request address is dealt with as if not including a branch instruction address even though the current instruction word may comprise a branch instruction. If the predicted branch destination address is always for a branch destination instruction on the "go" to branch side, such a branch instruction is treated as though indicative of "no go" to the branch.

It is preferred that the first entry indicates a real address of the branch instruction. It will be presumed that a first and a second part of the real instruction address is given by fourth through seventeenth bits IAR(:4–17) and twenty-ninth and thirtieth bits IAR(:29, 30) of the request address and. Preferably, the branch destination address is also a real address.

It is also preferred that the branch information further comprises a validity flag V which indicates validity of the branch information and, at the same time, the branch direction. For example, the validity flag V is a one-bit flag. A binary "1" validity bit indicates "go" to the branch and validity of the branch information. A binary "0" validity bit indicates "no go" to the branch and that the branch information is void. It is to be noted in connection with FIG. 6 that the validity flag or bit V is depicted as being contiguous &to the real branch instruction address as if a part of the first entry AA rather than contiguous to the real branch destination address as a part of the second entry DA. This is merely for convenience of description as will later become clear.

In FIG. 1 the branch history table 46 furthermore produces an address hit signal indicative of whether or not the current request address used for retrieval comprises a branch instruction address specified by one of the first entries. The address hit signal is delivered to an instruction prefetch control unit 47. It will be appreciated that the address hit signal serves as a predicted branch direction signal indicative of either of "no go" to the branch and "go" to the branch as a predicted branch direction.

A branch information buffer 48 has an address information and a branch information field partitioned in FIG. 1 by a thin vertical line. Concurrently with accumulation of the instruction words in the instruction buffer 43 in response to successive request addresses, branch instruction addresses included in the successive request addresses are accumulated in the address information field. The branch information produced by the branch history table 46 in response to such branch instruction addresses, are accumulated in the branch information field.

Figure 7:
FIG. 7 shows an entry in a branch information register used in the instruction prefetching device depicted in FIG. 1.

Turning to FIG. 7 it will be assumed that the branch information includes the validity bit V, so that the branch information stored in the branch information buffer 48 comprises the predicted branch destination address and the validity bit V. Although depicted in FIG. 7, an instruction word length is not stored in the branch information buffer 48.

Again in FIG. 1, a branch information switch 49 corresponds to the instruction aligner 44. More particularly, a first branch information register 51 has an address and a branch information field like the branch information buffer 48. The branch information switch 49 delivers the branch instruction address and the branch information from the branch information buffer 48 to the address and the branch information fields of the branch information register 51 simultaneously with delivery of each instruction word from the instruction buffer 43 to the instruction decoding circuit 36. Only when the instruction buffer 43 and accordingly the branch information buffer 48 is empty, the branch information switch 49 transfers the branch instruction address and the branch information to the branch information register 51 directly from the instruction address register 41 and the branch history table 46, respectively. It is to be noted in this connection that, when the instruction decoding circuit 36 is supplied either directly or indirectly with an instruction word read out of the instruction memory unit 31 in response to a certain one of the request addresses, the branch information register 51 is supplied with the branch instruction address comprised by the request address in question and with the branch information produced by the branch history table 46 in response to that request address. The instruction word and the branch instruction address will therefore be referred to afresh as a current instruction and a current branch instruction address.

Each of second and third branch information registers 52 and 53 has an address and a branch information field of the type described hereinabove. Upon subjecting the current instruction to the IA stage the content of the first branch information register 51 is moved to the second branch information register 52. When the current instruction is subjected to the IT stage the content of the second branch information register 52 is transferred to the third branch information register 53.

Figure 8:
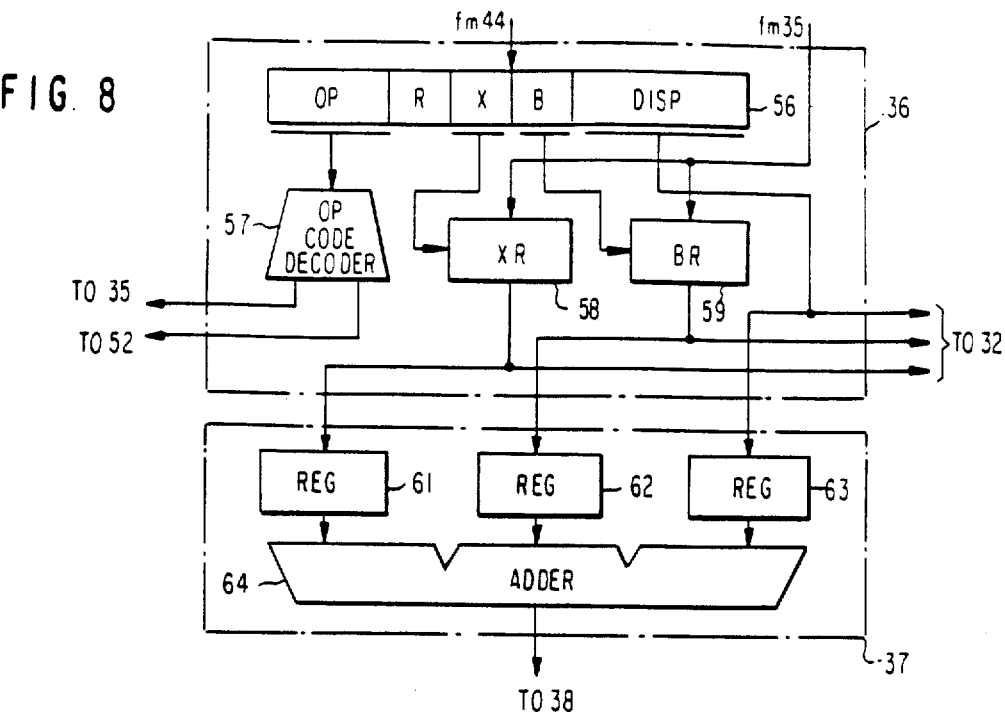
FIG. 8 is a detailed block diagram of a part of the data processing system shown in FIG. 1.

Referring to FIG. 8, the instruction decoding circuit 36 comprises an instruction register 56 in which each instruction is stored by the instruction aligner 44 (FIG. 1). In a manner known in the art, the instruction register 56 has operation code (OP). R, X. B. and displacement (DISP) fields. The operation code stored in the operation code field is decoded by an operation code decoder 57 to indicate operation of the instruction executing circuit 35 through a connection which is not shown in FIG. 1, and to store the instruction word length in the address information field of the second branch information register 52 as depicted in FIG. 7.

An index register unit (XR) 58 and a base register unit (BR) 59 are software-visible registers in which results of execution of the instruction are stored from the instruction executing circuit 35 through a connection no& illustrated in FIG. 1. The index and the base register units 58 and 59 are searched by the X and the B fields, respectively.

In FIG. 8, the operand address generator 37 is operative when the instruction register 56 is loaded with an instruction which requires an operand. Values searched from the index and base register units 58 and 59 and the displacement stored in the displacement field DISP of the instruction register 56 are stored in registers 61, 62, and 63, respectively. An adder 64 is for calculating a sum the of outputs of the respective registers 61 through 63 to deliver a logical address of the operand to the operand address translating unit 38.

Referring back to FIG. 1 again, an actual branch information register 65 has an address and a branch information field like the second and the third branch information registers 52 and 53. It will now be assumed that the current instruction delivered to the instruction address generating circuit 32 is a branch instruction indicative of "go" to the branch. The instruction address generating circuit 32 feeds a logical branch destination address to the instruction address translating circuit 33, which thereupon supplies a prediction evaluating or confirming circuit 66 and the branch information field of the actual branch information register 65 with an actual branch destination address signal indicative of an actual branch destination address obtained by execution of the current branch instruction. Concurrently, the instruction word length and the current branch instruction address are moved from the third branch information register 53 to the address information field of the actual branch information register 65.

Executing a branch instruction in compliance with the indication given from the operation code decoder 57 (FIG. 8). the instruction executing circuit 35 produces an actual branch direction signal indicative of an actual branch direction, namely, whether the stream of execution should have been directed to the "no go" to branch side or towards the "go" to branch side. The instruction executing circuit 35 capable of producing such a branch direction signal may be one described in U.S. Pat. No. 3,825.895 issued to Dee E. Larsen et al and assigned to Amdahl Corporation.

The prediction evaluating circuit 66 is supplied also with the actual branch direction signal from the instruction executing circuit 35 and the branch information from the third branch information register 53. It will be seen that a combination of the actual branch destination address signal and the actual branch direction signal gives a result of execution of a current instruction which is under executor by the instruction executing unit.

As described heretobefore in connection with FIG. 7, the branch information comprises the predicted branch destination address and preferably the validity bit V. As will later be described in more detail, the prediction evaluating unit 66 evaluates the branch information and produces a prediction evaluation signal indicative of correctness or incorrectness of the prediction, i.e., whether the predicted branch direction and the predicted branch destination address are correct or incorrect in view of the actual branch direction and the actual branch destination address respectively which become evident as a result of execution.

An instruction address adder 67 is fed from the address information field of the actual branch information register 65 with the current branch instruction address and the instruction word length of the current branch instruction to produce a next instruction address for an instruction which follows the current branch instruction in the instruction sequence. An instruction address selector 69 is controlled by the actual branch direction signal to select the next instruction address and the actual branch destination address as a selected instruction address when the actual branch direction signal indicates the "no go" to branch and the "go" to branch sides, respectively.

The selected instruction address is stored in a selected destination address register 71 and delivered thence to the request address selector 42 and to the branch history table 46. When selected by the request address selector 42, the selected instruction address is used for prefetch of an instruction next subsequent to the current branch instruction in the stream of execution. The current branch instruction address is supplied also to the request address selector 42 directly from the actual branch information register 65. The prediction evaluation signal is stored in a write pulse flip-flop 72 during one machine cycle and delivered thence to the branch history table 46. When indicative of failure or incorrectness of the prediction, the prediction evaluation signal serves as a write pulse for the branch history table 46. When selected by the request address selector 42, the current branch instruction address is used in accessing the branch history table 46 for renewal or updating of the branch information in response to the write pulse and with reference to the actual branch destination address stored in the selected destination address register 71 as a selected instruction address. Incidentally, a branch instruction detector 73 will be described much later herein.

In the example being illustrated, the instruction prefetch control unit 47 is controlled by the address hit signal and the prediction evaluation signal. It is typical that branch instructions are included only here and there in an instruction sequence. The address hit signal therefore ordinarily indicates absence in the branch history table 46 of the address information which specifies a branch instruction address. Responsive to the address hit signal indicative of this absence, the control unit 47 makes the request address selector 42 select the next request address supplied from the request address adder 45.

When the address hit signal indicates presence in the branch history table 46 of address information which specifies the instruction address of a branch instruction, the control unit 47 makes the request address selector 42 select the predicted branch destination address supplied from the branch history table 46. Prefetch proceeds to the branch destination instruction on the "go" to branch side at once, without waiting for the result of decoding of the branch instruction.

Either when the predicted branch destination address is not coincident with the actual branch destination address or when the predicted branch direction is not coincident with the actual branch direction, the control unit 47 is informed of this fact by the prediction evaluation signal indicative of failure of the prediction. The selected instruction address is set in the selected destination address register 71 irrespective of the prediction evaluation signal.

If the actual branch direction is to the "no go" to branch side, the next instruction address selected by the instruction address selector 69 as the selected instruction address is used for prefetch of the instruction which follows next to the current instruction in the instruction sequence. The control unit 47 makes the request address selector 42 select the current branch instruction address which is supplied directly from the actual branch information register 65. The write pulse resets the validity bit V of the branch information corresponding to the address information which specifies the branch instruction address under consideration.

If the actual branch destination is towards the "go" to branch side the selected instruction address is the actual branch destination address selected by the instruction address selector 69. The write pulse substitutes the actual branch destination address for the existing branch destination address specified by the branch information in accordance with the address information which specifies the branch instruction in question. Immediately thereafter, the prefetch proceeds in accordance with the updated branch information.

Figure 9:
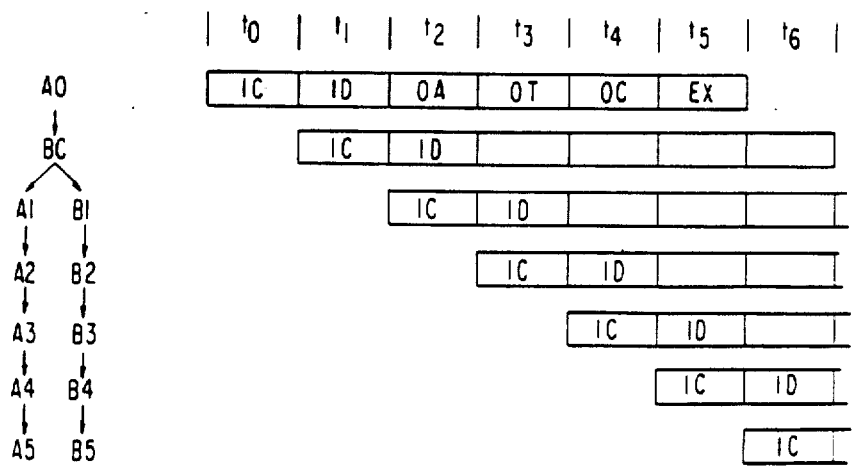
FIG. 9 is a diagram for use in describing the operation of the instruction prefetching device depicted in FIG. 1.

Referring to FIG. 9, prefetch of the instruction sequence exemplified in FIGS. 3 and 4 will be described for a case where correctness of the prediction is indicated to the prefetch control unit 47 by the prediction evaluation signal produced by the prediction evaluating unit 66. Attention will now be directed only to the IC and the following stages assuming that the IC through EX stages are carried out for the branch condition instruction AO at the zeroth through the fifth instants $t_0$ to $t_5$.

At the IC stage carried out for each instruction the current request address is used as usual in reading the instruction from the instruction memory unit 31. At the same time, the request address is used in retrieving the branch history table 46.

At the first instant $t_1$, the branch instruction BC is read out of the instruction memory unit 31. The branch history table 46 produces the address hit signal and the branch information which specifies a branch destination address. When the address hit signal indicates "no go" to the branch as the predicted branch direction, the IC stage is carried out at the second, third, and subsequent instants $t_2, t_3, \ldots$ for the instructions A1, A2, and so on which are on the "no go" to branch side. When the address hit signal indicates "go" to the branch, the IC stage is carried out at the second third, and subsequent instants $t_2, t_3, \ldots$ for the instructions B1 and so forth which are on the "go" to branch side. The EX stage is carried out for the branch condition instruction AO at the fifth instant $t_5$. Inasmuch as the prediction is correct in the case being considered, prefetch proceeds in the predicted branch direction at the sixth instant $t_6$ and thereafter either for the instruction A5 and others or for the instruction B5 and so on without any disturbance to the stream of prefetch operation.

Figure 10:
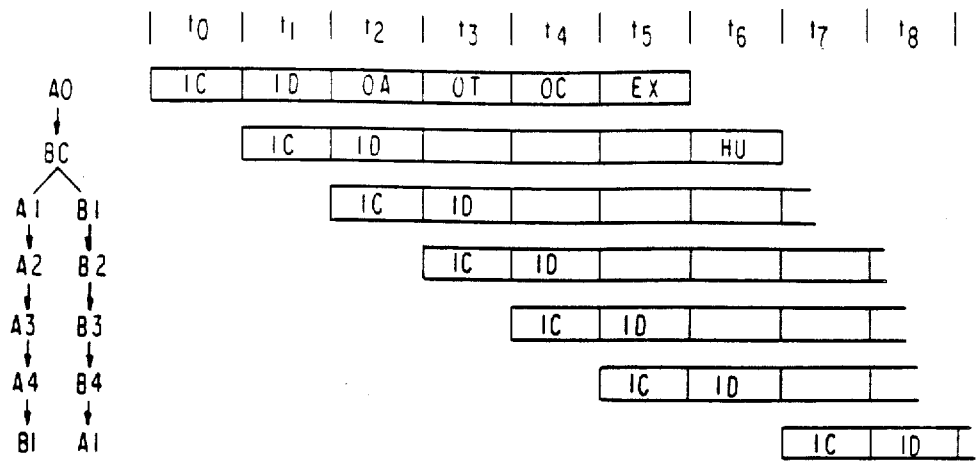
FIG. 10 is another diagram for use in describing the operation of the instruction prefetching device shown in FIG. 1.

Turning to FIG. 10, it will now be assumed that failure of the prediction is indicated by the prediction evaluation signal. As described with reference to FIG. 9, prefetch proceeds at the second through the fifth instants $t_2$ to $t_5$ for the instructions A1 through A4 and for the instruction B1 through B4 when the prediction is "no go" to the branch and "go" to the branch, respectively. At the fifth instant $t_5$, the prediction is determined to be incorrect as a result of the EX stage carried out for the branch condition instruction AO. At the sixth instant $t_6$, the branch history table 46 is updated or renewed as indicated along the line for the branch instruction BC by HU (history update). At the seventh instant $t_7$, the IC stage is carried out afresh either for the foremost instruction B1 on the "go" to branch side or for the instruction A1 on the "no go" to branch side along a proper stream of instruction execution.

Reviewing FIGS. 9 and 10, the loss cycle is nil if the prediction is correct. The loss cycle is five machine cycles long if the prediction fails. Inasmuch as the prediction is not only for the branch direction but also for the branch destination address, the degree $\alpha$ of correctness of the prediction is somewhat smaller than that for the case of the Smith patent application described with reference to FIG. 4. The decrease is, however, trivial and may again be about 0.8. The average loss cycle for each branch instruction is:

$$0 \cdot \alpha + 5 \cdot (1-\alpha) = 1 \text{ (cycle)},$$

and is astonishingly reduced.

Once again in FIG. 1, the request address adder 45 would calculate the sum for the real address. In a data processing system which carries out paging the next request address may therefore become over or beyond the page being referred to. In this case of a page-over the IT stage must be carried out anew. Under these circumstances, the request address adder 45 should comprise a detector (not shown) for detecting page-over to produce a page-over signal. The page-over signal is delivered to the instruction address generating circuit 32 to again start the process from the IA stage.

Figure 11:
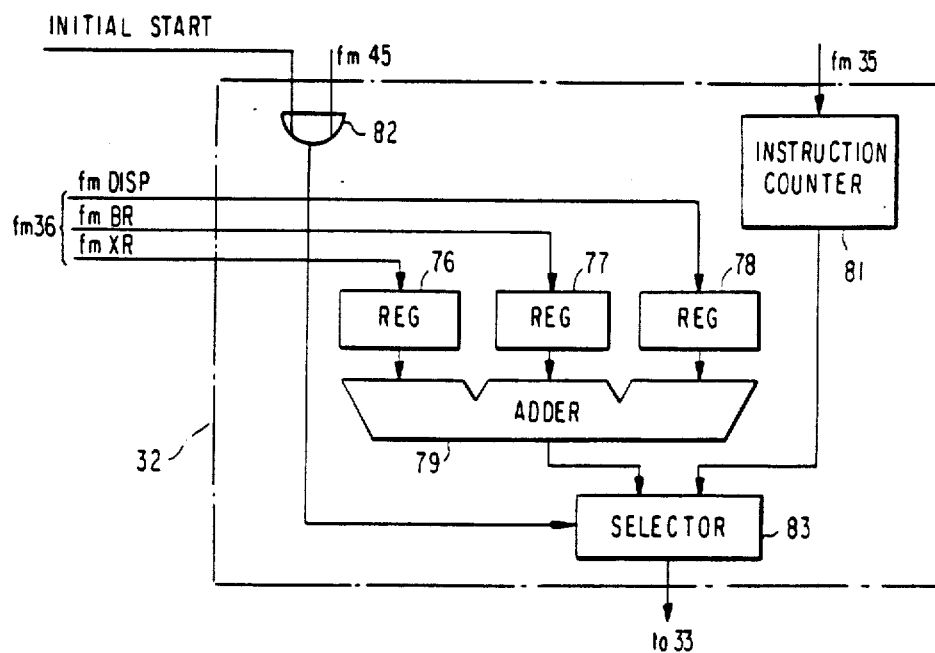
FIG. 11 is a detailed block diagram of another part of the data processing system depicted in FIG. 1.

Turning to FIG. 11, the instruction address generating circuit 32 comprises first through third registers 76 77 and 78 which are loaded with the values searched from the index and base register units 58 and 59 (FIG. 8) and with the displacement given from the displacement field of the instruction register 56, respectively. An adder 79 is for calculating a sum of outputs of the respective registers 76 through 78 to provide a logical address. When a branch instruction is stored in the instruction register 56 as a current branch instruction, the logical address is a logical branch destination address for the current branch instruction.

An instruction counter 81 is for indicating a next logical address of a subsequent instruction which should be executed subsequent to a current instruction. For this purpose, the instruction counter 81 is updated through a connection (not illustrated in FIG. 1) by a result of execution carried out for the current instruction by the instruction executing circuit 35. An OR circuit 82 is for producing an OR output signal in response to either the page-over signal or an initial start signal supplied from outside the data processing system being illustrated. Responsive to the OR output signal, a logical address selector 83 selects the next logical address to deliver the same to the instruction address translating circuit 33 for prefetch of the subsequent instruction. Otherwise, the logical address selector 83 supplies the instruction address translating circuit 35 with the logical address calculated by the adder 79.

Figure 12:
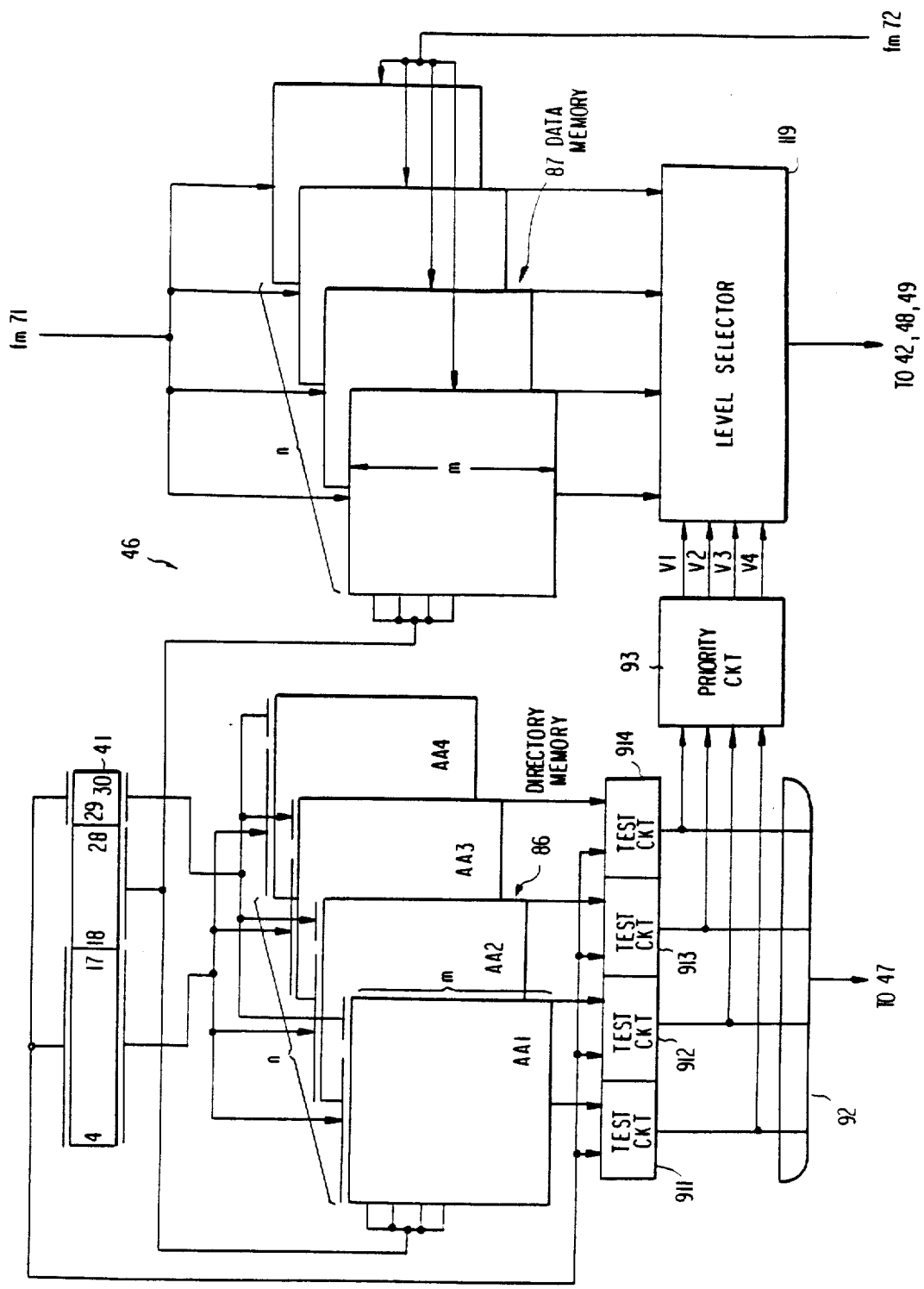
FIG. 12 shows in blocks the branch history table mentioned in conjunction with FIG. 6, together with related circuitry.

Referring now to FIG. 12' the branch history table 46 may comprise a directory memory 86 and a data memory 87. Each memory 86 or 87 is an m-set, n-level memory, where each of m and n represents a natural number which is predetermined in a known manner in consideration of the architecture of the data processing system. The directory and the data memories 86 and 87 are for memorizing the address information AA and the branch information DA, respectively, as illustrated with reference to FIG. 6 and are retrieved by a set address IAR(:- 18–28) of the current request address IAR in accordance with the set associative method which is known in the art and will briefly be described hereunder.

It will be assumed in the following that there are four levels, as is usual. First through fourth levels of the directory memory 86 will be designated AA1 through AA4. The directory memory levels AAi's (i being representative of one of 1 through 4) are for storing a plurality of branch instruction address information AA corresponding to one set address stored in the bit positions 18–28 of the register 41 shown in FIG. 12.

First through fourth test circuits 911, 912, 913, and 914, or 91i's are associated with the first through the fourth directory memory levels AAi's, respectively. Each test circuit 91i is supplied with the first and the second real address parts IAR(:4–17) and IAR(:29, 30) of the current request address IAR and each of these test circuits will then test for the presence or absence of the current branch instruction address in the associated directory memory level AAi. Any given test circuit 91i will produce an i-th partial hit signal which takes logic "1" and "0" levels in the presence or absence, respectively, of the current branch instruction address. Responsive to the partial hit signal, an OR circuit 92 delivers the above-described address hit signal to the instruction prefetch control unit 47. The partial hit signals produced by the respective test circuits 91i's are also delivered to a priority circuit 93 for a purpose which will shortly become clear.

Figure 13:
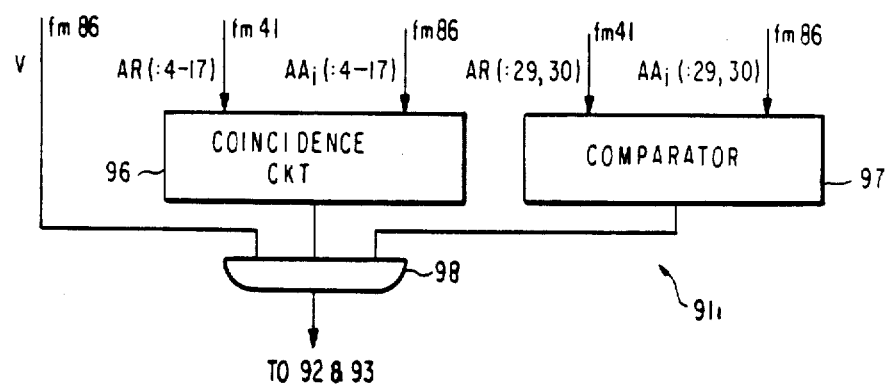
FIG. 13 is a block diagram of a test circuit for use in the branch history table illustrated in FIG. 12.

Turning to FIG. 13, it will be assumed that the validity bit V is memorized in the directory memory level AAi. Each test circuit 91i may comprise a coincidence circuit 96 for detecting coincidence and lack of coincidence between a first real address part IAR (:4–17) of the current request address and a first real part AAi(:- 4–17) supplied from the associated directory memory level AAi to produce a coincidence signal which takes logic "1" and "0" levels upon detection of coincidence and non-coincidence, respectively. A comparator 97 is for comparing the second real address part IAR(:29, 30) of the current request address with a second real address part AAi(:29, 30) supplied from the associated directory memory level AAi to produce a comparison result signal which takes logic "1" level when the second real address part of the current request address is or equal to the second real address part supplied from the associated directory memory level AAi, and which takes a logic level "0" if the former is greater than the latter. The coincidence signal and the comparison result signal are delivered to an AND circuit 98 together with the validity bit V to become the partial hit signal.

The coincidence signal of the logic "1" level indicates that the associated directory memory level AAi is loaded with an entry which specifies a branch instruction address of a branch instruction comprised by an eight-byte instruction word accessed by the current request address. The level "1" coincidence signal is, however, insufficient to establish coincidence between the current request address and a branch instruction which should thereby be prefetched.

Attention will be directed to the instruction word exemplified in FIG. 5. Let the instructions BC0, BC1, and BC2 be branch instructions indicative of "go" to the branch and the instruction A, a different instruction. If another preceding branch instruction (not shown) indicates the different instruction A of an instruction address <A> (labelled in FIG. 5) as a branch destination instruction a request address set in the instruction address register 41 includes the address <A>. In this event, the instruction which should be prefetched next subsequent to the different instruction A in the stream of execution, should not be the branch instruction BC2 but should be the branch instruction BC1 which next follows the different instruction A in the instruction sequence In FIG. 13, the comparator 97 and the AND circuit 93 are for correctly producing the partial hit signal. Logic "1" partial hit signals are, however produced under the circumstances by the test circuits 91i's which are associated with the directory memory levels AAi's loaded with entries for the branch instructions BC1 and BC2. The priority circuit 93 is for selecting only the partial hit signal for the branch instruction BC1.

Figure 14:
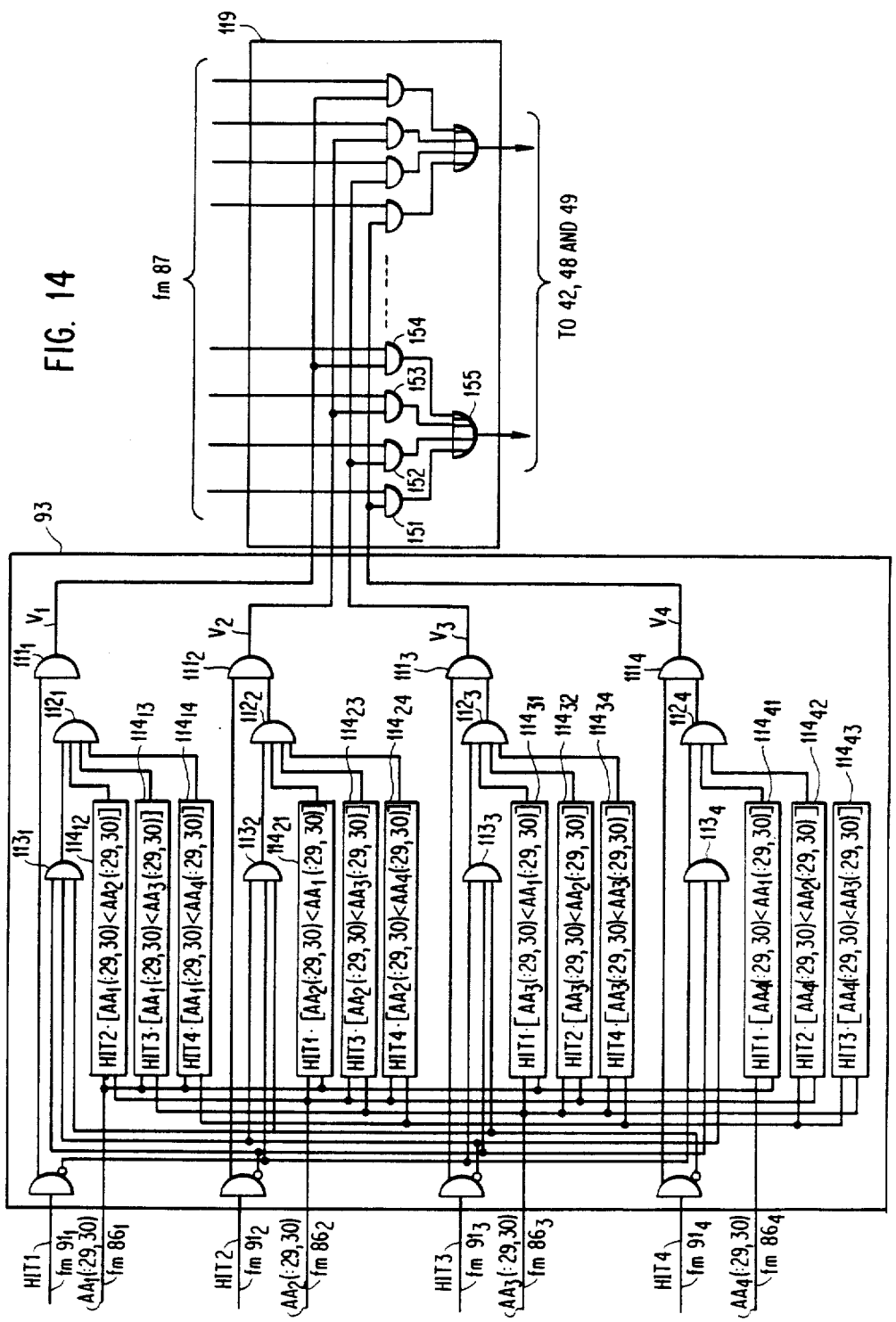
FIG. 14 is a block diagram of a priority circuit and level selector for use in the branch history table shown in FIG. 12.

In the priority circuit 93 and level selector 119, as shown in FIG. 14, the second real parts AAi (:29, 30) of the branch instruction addresses read out of each of the levels of directory memory 86 are compared with one another to perform an ordering function in a well-known manner. After the second real address parts have been prioritized, the highest priority branch instruction address of those branch instruction addresses which are accompanied by a HITi signal from their corresponding test circuit 91i is passed as a signal V1–V4. In this way, the signal V1–V4 will indicate the level of the directory memory 86 from which the highest priority branch instruction address was obtained, and will correspondingly indicate the level of the data memory 87 whose output provides the desired branch destination address.

Referring back to FIG. 12, the branch history table 46 comprises a level selector 119 connected to the levels of the data memory 87 and supplied with the first through fourth selection signals V1 to V4 from the priority circuit 93. In the example shown, the level selector 119 comprises n sets of AND gates 151-154 as well as OR gate 155. In the example described with reference to FIGS. 5 and 12, two of the data memory levels produce branch information, specifying branch destination addresses of the branch instructions BC1 and BC2. The one of the selection signals V1–V4 having the logic "1" level selects the branch information for the pertinent branch instruction BC1 alone. It is thereby possible to establish correspondence between the branch information produced by the branch history table 46 and the current instruction produced in response to the current request address.

Correct retrieval by the priority circuit 93 and level selector 119 is performed based on the following logic formula:

$$V_i =$$

-continued $$HIT_i \cdot \left\{ \bigcap_{i \neq j}^{n} HIT_j + \sum_{i=j}^{n} HIT_j (AA_i(;29, 30) < AA_j(;29, 30)) \right\}$$

where Vi is a selection designating signal of i level: HITj is a partial hit signal of each level given from the test circuit 91: and AAj (;29, 30) are address signals from the bit fields 29 and 30 of the BHT-Address Array 86.

In the above formula, the term $$\bigcap_{i \neq j}^{n} HIT_j$$

functions so that the signal Vi is "1" when the partial hit signals of the levels other than i level are all "0"'s. The term $$\sum_{i \neq j}^{n} HIT_j$$

(AAi (;29, 30) <AAj (;29, 30)) functions so that the signal Vi is "1" when the partial hit signals of i and j levels are "1" and the value of AAi (;29, 30) is smaller than the value of AAj (;29, 30).

Referring to FIG. 14, the AND gates $111_1$ to $111_4$ perform an AND operation of HITi and the term $$\left\{ \bigcap_{i \neq j}^{n} HIT_j + \sum_{i \neq j}^{n} HIT_j (AA_i(;29, 30) < AA_j(;29, 30)) \right\}$$

of above formula. The AND gate $113_1$ to $113_4$ achieve the function of the term $$\bigcap_{i \neq j}^{n} HIT_j$$

in the formula. The OR gates $112_1$ to $112_4$ perform an OR operation of the term $$\bigcap_{i \neq j}^{n} HIT_j$$

and the term $$\sum_{i \neq j}^{n} HIT_j$$

(AAi (;29, 30) <AAj (;29, 30)) in the above formula.

The boxes shown at reference numerals $114_{12}$, $114_{13}$, $114_{14}$, $114_{21}$, $114_{23}$, $114_{24}$, $114_{31}$, $114_{34}$, $114_{41}$, $114_{42}$, and $114_{43}$ achieve the function of the $$\sum_{i \neq j}^{n} HIT_j$$

(AAi (;29, 30) <AAj (;29, 30)).

Figure 22:
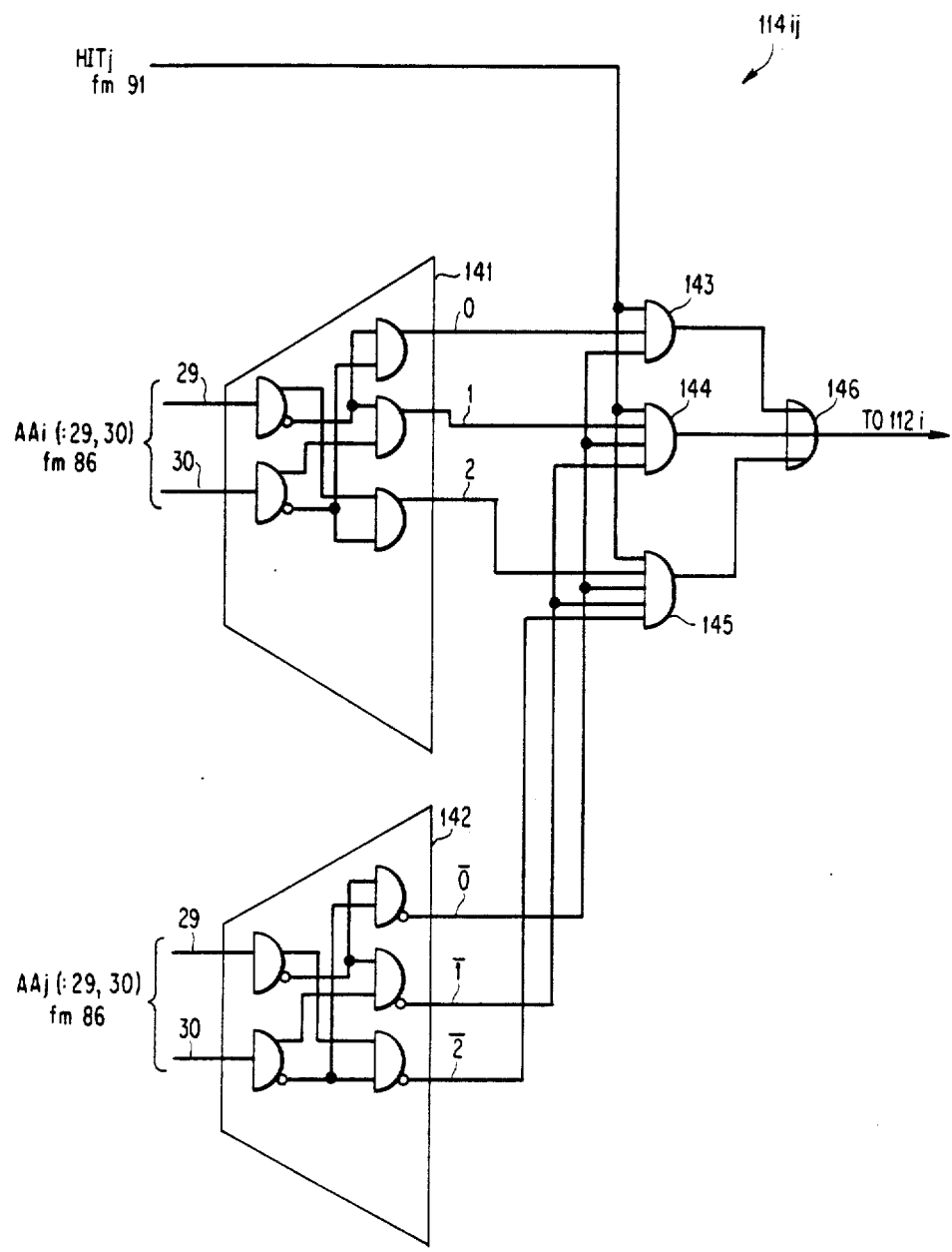
FIG. 22 is a diagram of a circuit for implementing one section of the priority circuit shown in FIG. 14.

FIG. 22 shows one example of a circuit embodying the term $$\sum_{i \neq j}^{n} HIT_j$$

(AAi (;29, 30) <AAj (;29, 30)). In FIG. 22, the decoders 141 and 142 execute the decoding of the address signals AAi (;29, 30) and AAj (;29, 30). The AND gates 143. 144 and 145 and the OR gate 146 generate "1" when the value of the address signal AAi (;29, 30) is smaller than that of the address signal AAj (;29, 30).

Reviewing FIGS. 12 and 14, the branch history table 46 is addressed at first by the set address given by the current request address. If it happens that a plurality of branch instruction addresses are specified by the address information stored in one of the sets accessed by the set address, the priority circuit 93 is used to pick up one of the branch instruction addresses as a picked-up instruction address that is for a branch instruction, such as BC1 which should be prefetched next subsequent to the current instruction. The level selector 119 selects the branch information which comprises the branch destination address known by prior execution of the branch instruction in question and therefore corresponds to the pick-up address. It will now be appreciated that the prefetch accurately and rapidly proceeds even when a plurality of branch instructions exist in a single instruction word, which is a unit of prefetch.

Figure 15:
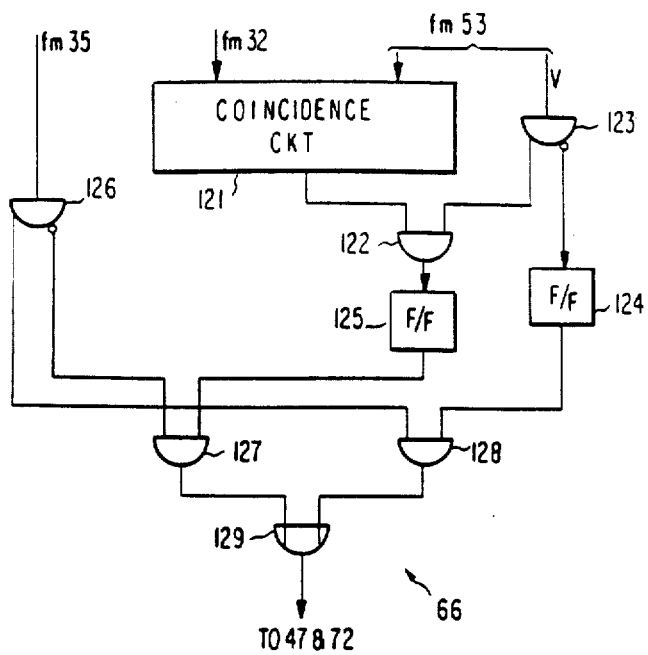
FIG. 15 is a block diagram of a prediction evaluating unit for use in the instruction prefetching device illustrated in FIG. 1.

Turning to FIG. 15, the prediction evaluating unit 66 may comprise a coincidence circuit 121 for detecting coincidence or non-coincidence between the actual branch destination address supplied from the instruction address translating circuit 33 and the predicted branch destination address fed from the branch information field of the second branch information register 52. The coincidence circuit 121 supplies an AND circuit 122 with a non-coincidence signal which takes the logic "0" and "1" levels upon detection of coincidence and non-coincidence, respectively. A validity bit true (single-input double output gate) circuit 123 is supplied with the validity bit V from the branch information field of the second branch information register 52 and delivers a validity bit to the AND circuit 122 and to a validity bit flip-flop 124. The AND circuit 122 delivers its output to a destination address flip-flop 125. Each of the flip-flops 124 and 125 is for holding an input signal supplied thereto until production of a result of execution by the instruction executing circuit 35 for a current instruction for which the predicted and the actual branch destination addresses are supplied to the prediction evaluating unit 66 together with the validity bit V. The validity bit flip-flop 124 produces a "go" prediction signal which takes the logic "1" level when the validity bit V indicates "go" to the branch, and which has a logic level "0" when the validity bit V indicates "no go" to the branch. The destination address flip-flop 125 produces a "go" address hit signal which takes the logic "1" level when the predicted branch direction is "go" to the branch and moreover when coincidence is not detected between the predicted and the actual branch destination addresses. Otherwise, the "go" address hit signal has the logic "0" level.

A result true circuit 126 is supplied with the actual branch direction signal from the instruction executing circuit 35 and delivers an actual branch direction signal to a "branch direction" failure AND circuit 127 while delivering the actual branch direction signal to a "branch address" failure EXCLUSIVE OR circuit 128.

The "branch address" failure AND circuit 127 therefore can only produce a "branch address" failure signal which takes the logic "1" level when the non-coincidence is detected between the actual and predicted branch destination addresses. The "branch direction" failure EXCLUSIVE OR circuit 128 produces a "branch direction" failure signal which takes the logic "1" level whenever the actual branch direction is different from the predicted branch direction. Responsive to the "branch address" and the "branch direction" failure signals, an OR circuit 129 supplies the instruction prefetch control unit 47 and the write pulse flip-flop 72 (FIG. 1) with the prediction evaluation signal.

In the example being illustrated, the prediction evaluation signal takes the logic "0" and "1" levels irrespective of the predicted branch destination address when the predicted branch direction is correct and incorrect, respectively. In such a case, the coincidence and the AND circuits 121 and 122 may be dispensed with.

Figure 16:
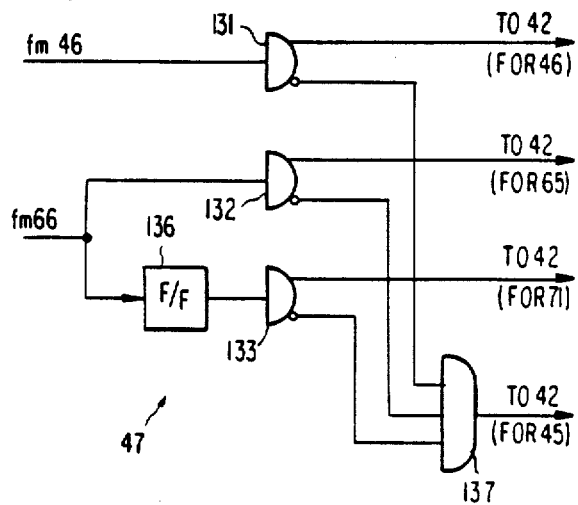
FIG. 16 is a block diagram of an instruction prefetch control unit for use in the instruction prefetching device shown in FIG. 1.

Turning further to FIG. 16, the instruction prefetch control unit 47 may comprise first through third true-false circuits 131, 132, and 133 supplied with the address hit signal from the branch history table 46 to deliver the address hit signal to the request address selector 42 (FIG. 1) as a first selection signal, with the prediction evaluation signal being supplied to the control unit directly from the prediction evaluating unit 66 to deliver the prediction evaluation signal to the request address selector 42 as a second selection signal, and with the prediction evaluation signal being supplied through a flip-flop 136 to deliver the prediction evaluation signal to the request address selector 42 as a third selection signal with a delay of one machine cycle. An inverted address hit signal, an inverted prediction evaluation signal without the delay, and a delayed and inverted prediction evaluation signal are fed to a three-input AND circuit 137, which delivers a fourth selection signal to the request address selector 42.

When the address hit signal takes the logic "1" level, the first selection signal takes the logic "1" level to make the request address selector 42 select the predicted branch destination address supplied from the branch history table 46. When the prediction evaluation signal takes the logic "1" level, the second selection signal takes the logic "1" level to make the request address selector 42 select the current branch instruction address which is fed directly from the address information field of the actual branch information register 65. During one machine cycle which next follows turning of the prediction evaluation signal to the logic "1" level, the third selection signal is given the logic "1" level to make the request address selector 42 select the selected instruction address which is stored in the selected destination address register 71 and fed therefrom.

Whenever the address hit signal takes the logic "1" level, the AND circuit 137 is supplied from the first true-false circuit 131 with its output turned to the logic "0" level. The fourth selection signal is switched to the logic "0" level. Insofar as the prediction evaluation signal is left at the logic "0" level, the AND circuit 137 is supplied from the second and the third true-false circuits 132 and 133 with their outputs given the logic "0" level. The fourth selection signal is kept at the logic "1" level as long as the address hit signal is left at the logic "0" level. The fourth selection signal is switched to the logic "0" level only when the address hit signal takes the logic "1" level. As soon as the prediction evaluation signal is switched to the logic "1" level, the AND circuit 137 is supplied from the second true-false circuit 132 with its output turned to the logic "0" level. One machine cycle immediately thereafter, the AND circuit 137 is supplied from the third true-false circuit 133 with its output turned to the logic "0" level. The AND circuit 137 thus receives two inputs kept at the logic "0" level during two consecutive machine cycles. In the meantime, the fourth selection signal is never turned to the logic "1" level irrespective of the address hit signal. The fourth selection signal of the logic "1" level is used to make the request address selector 42 select the next request address which is fed from the request address adder 45.

Figure 17:
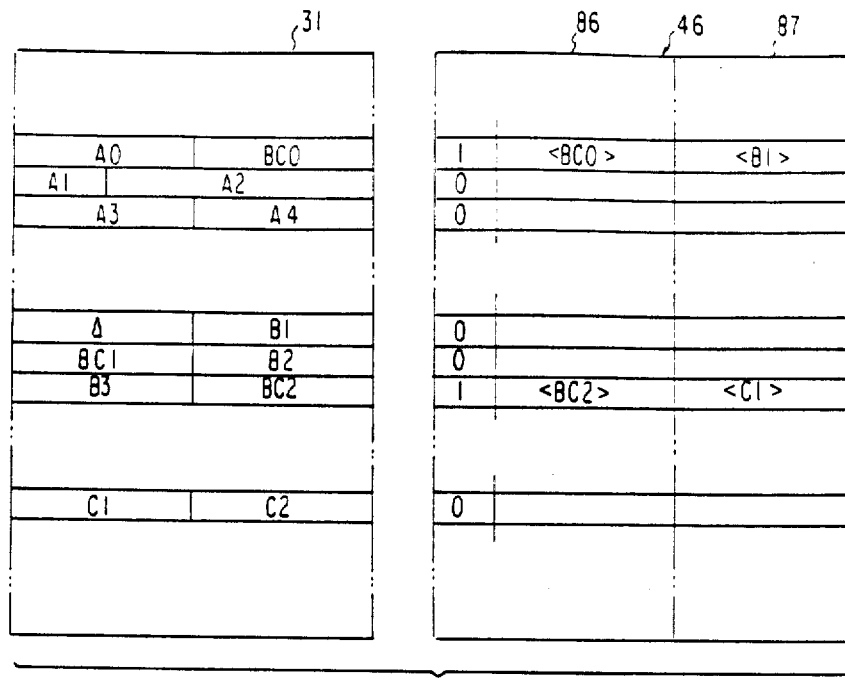
FIG. 17 is a diagram representative of correspondence between an instruction memory unit used in the data processing system shown in FIG. 1 and the branch history table of the type mentioned in connection with FIGS. 6 and 12.

Referring now to FIG. 17, the instruction memory unit 31 is for eight-byte instruction words. Consideration will be given hereunder to an instruction sequence which comprises instruction A0, BC0, A1, A2, A3, A4, ..., B1, BC1, B2, B3, BC2, ..., C1, C2, and others in succession. The instructions BCk (k being representative of 0, 1, 2, ...) are branch instructions. The instruction A) may or may not be a branch condition instruction.

In correspondence to the instruction sequence memorized in the instruction memory unit 31, the directory memory 86 stores the address information which specifies the instruction addresses <BC0> and <BC2> of the branch instructions BC0 and BC2 indicative of "go" to the branch according to prior results of execution. The directory memory 86 furthermore stores the logic "1" validity bits in correspondence to the branch instructions BC0 and BC2 and a logic "0" validity bit in correspondence to the branch instruction BC1 which indicates "no go" to the branch in accordance with prior results of execution. The validity bits of the remaining branch information are rendered logic "0". The data memory 87 stores, for the branch instructions BC0 and BC2, the branch destination addresses <B1> and <C1> in compliance with prior results of execution of the branch instructions BC0 and BC2, respectively.

Figure 18:
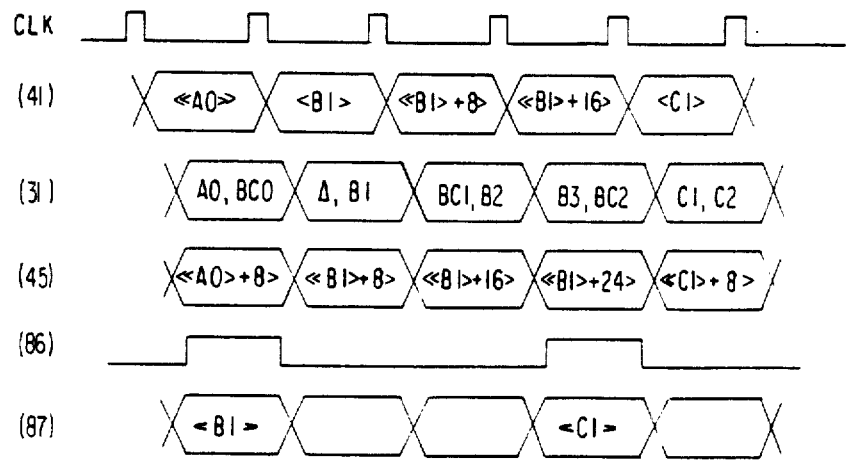
FIG. 18 is a schematic diagram for use in describing the operation of the instruction prefetching device comprising the branch history table of the type shown in FIG. 17.

Turning to FIG. 18, a clock pulse sequence CLK is depicted at the top in place of the time instants $t_0$, $t_1$, etc., shown in FIGS. 3, 4, 9, and 10. Operation of the instruction address register 41, the instruction memory unit 31, the directory memory 86 of the type illustrated in FIG. 17, and the data memory 87, is schematically depicted along lines labelled (41), (31), (45), (86), and (87).

On prefetching the instruction sequence under consideration, a boundary address <<A0>> is stored in the instruction address register 41 for the eight-byte instruction word which includes the instruction A0 as a foremost instruction. The instruction word (A0, BC0) is read out of the instruction memory unit 31. In the meantime, the request address adder 45 produces the next request address <<A0>+8>. Simultaneously with read out of the instruction word (A0, BC0), the branch history table 46 is accessed. Inasmuch as the address information specifying the branch instruction address <BC0> is stored in the directory memory 86, the address hit signal supplied to the instruction prefetch control unit 47 is switched to the logic "1" level. Furthermore, the branch information which comprises the branch destination address <B1>, is delivered to the request address selector 42. The control unit 47 makes the request address selector 42 set the branch destination address <B1> in the instruction address register 41 as depicted along the line (41). Incidentally, the branch destination address <B1> is delivered also toward the first branch information register 51 together with the validity bit V.

Responsive to the branch destination address <B1> set in the instruction address register 41, the instruction memory unit 31 produces the instruction word (Δ, B1). Meanwhile, the request address adder 45 provides the next request address <<B1>+8>. The branch history table 46 is accessed by the request address set in the instruction address register 41. Inasmuch as the directory memory 86 is loaded with a validity bit V indicative of invalidity, the address hit signal is turned to the logic "0" level. Prefetch proceeds along the "go" to branch side by the use of successive request addresses calculated by the request address adder 45 until the validity bit V indicative of validity of the branch information is found in the branch history table 46 by accessing the table 46 with the request address for the instruction word (B3. BC2).

The instruction words thus read out of the instruction memory unit 31 are accumulated in the instruction buffer 43 as a queue in the order in which the prefetched instructions should be executed. Incidentally, it is possible to continue prefetch of the instructions on the "no go" to branch side for a short while even upon production of an address hit signal of the logic "1" level and to thereafter prefetch the instructions in the predicted branch direction.

Figure 19:
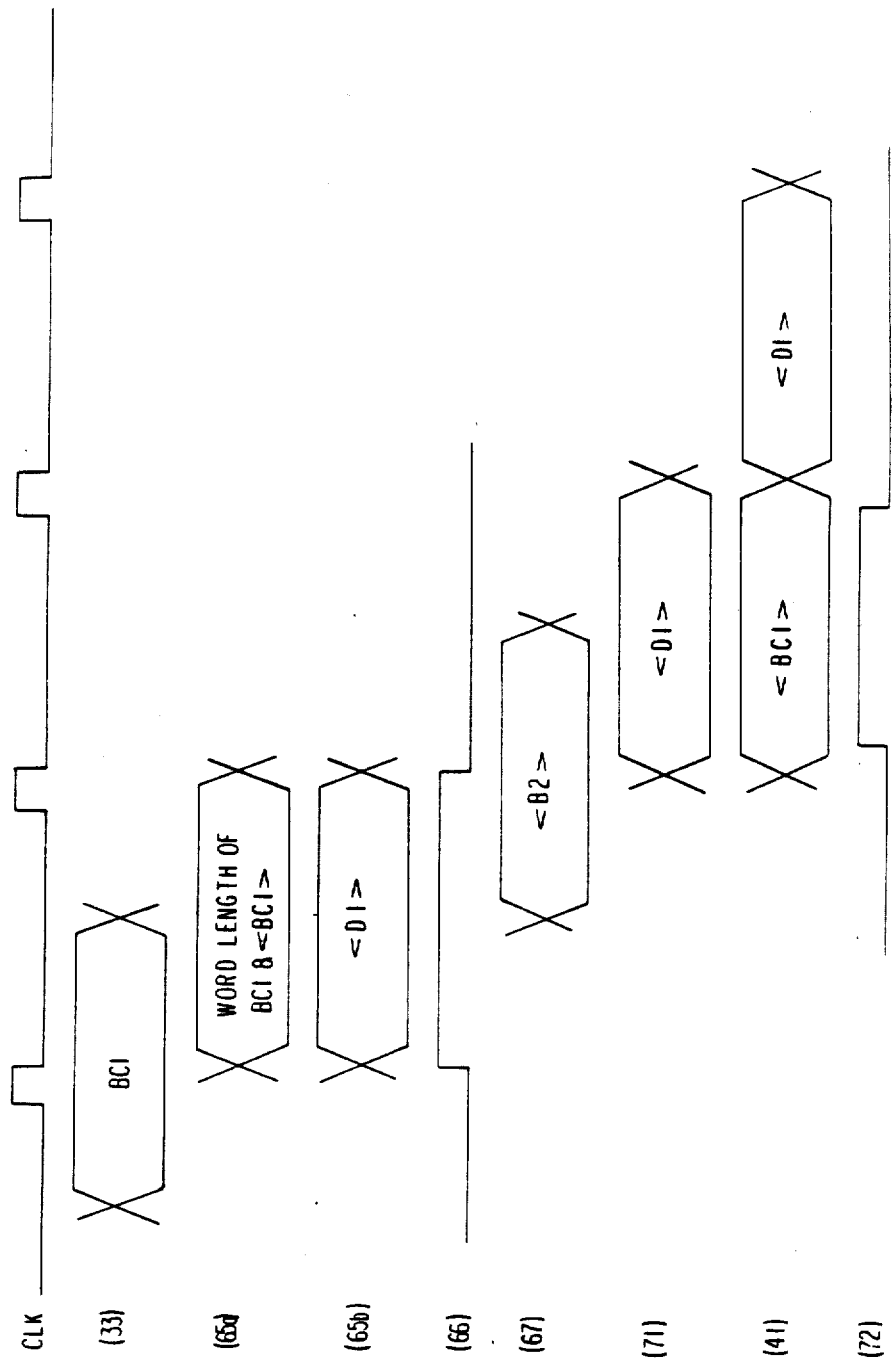
FIG. 19 is another schematic diagram for use in describing the operation of the instruction prefetching device mentioned in conjunction with FIG. 18.

Further turning to FIG. 19, operation of the address translating circuit 33, the address and the branch information fields of the actual branch information register 65, the prediction evaluating unit 66, the instruction address adder 67, the selected destination address register 71, the instruction address register 41, and the write pulse flip-flop 72, is schematically illustrated along lines labelled (33), (65a), (65b), (66), (67), (71), (41), and (72). It will now be assumed that the address translation is carried out by the address translating circuit 33 for the branch instruction BC1. The predicted branch direction is to &:he "no go" to branch side as has so far been assumed. Let an actual branch destination address <D1> of a new branch destination instruction D1 (not shown in FIG. 17) be nevertheless obtained as a branch destination address on the "go" to branch side by a result of the address translation.

Irrespective of the predicted and the actual branch direction and destination addresses, the address information field of the actual branch information register 65 is loaded with the instruction word length of the branch instruction BC1 and the current branch instruction address <BC1>. The branch information field is now loaded with the actual branch destination address <D1> together with the logic "1" validity bit. The instruction executing circuit 35 makes the actual branch destination signal indicate "go" to the branch. Inasmuch as the "no go" to branch side is indicated by the validity bit V supplied from the third branch information register 53, the prediction evaluating unit 66 produces the prediction evaluation signal of the logic "1" level, which indicates failure of the predicted branch direction. Irrespective of the prediction evaluation signal, the instruction address adder 67 produces the next instruction address <B2> as the branch destination address on the "no go" to branch side.

Rather than the branch destination address on the "no go" to branch side, the actual branch destination address <D1> is selected by the instruction address selector 69 and stored in the selected destination address register 71 together with the logic "1" validity bit. Responsive to the logic "1" prediction evaluation signal, the second selection signal (FIG. 16) makes the request address selector 42 set the current branch instruction address <BC1> in the instruction address register 41 for renewal of the branch history table 46. The write pulse flip-flop 72 delivers a write pulse to the branch history table 46 to update the branch information with reference to the selected destination address register 71. The third selection signal (FIG. 16) moves the actual branch destination address <D1> from the selected destination address register 71 to the instruction address register 41.

In connection with FIGS. 18 and 19, the branch instruction BC0 will again be taken into consideration. As described for the branch instruction BC1 in conjunction with FIG. 19, the instruction address adder 67 calculates the next instruction address <A1> (FIG. 17) as the branch destination address on the "no go" to branch side.

If the actual branch direction signal indicates "no go" to the branch, the next instruction address <A1> is selected by the instruction address selector 69 and stored in the selected destination address register 71 together with a logic "0" validity bit. Prior thereto, the prediction evaluation signal is switched to the logic "1" level. Upon production of the second selection signal, the current branch instruction address <BC0> is set in the instruction address register 41. With reference to the logic "0" validity bit stored in the selected destination address register 71, the write pulse cancels the branch destination address <B1> hitherto stored the data memory 87 for the branch instruction BC0. In addition, the validity bit V is reset. The third selection signal moves the next instruction address <A1> from the selected destination address register 71 to the instruction address register 41.

From the description thus far made herein with respect to renewal of the branch history table 46, it will now be understood that it is possible to use various algorithms for renewing the branch destination address and validity bit V. Depending on the algorithm used, the renewal may statistically be carried out by keeping the results of execution of each branch instruction until completion of prefetch of the instruction sequence being dealt with.

When a new entry pair of first and second entries should be stored afresh in the branch history table 46, a problem may arise with regard to the sets in which the new entry pair should be substituted for an existing entry pair. It is desirable in this event to resort to the least recently used (LRU) scheme, according to which the sets are selected where the existing entry pair was the least recently used among the existing entry pairs. Alternatively, the first-in, first-out (FIFO) scheme may be resorted to, i.e., to select the sets where the existing entry pair was stored earliest of the existing entry pairs.

Referring back to FIG. 1, the instruction word may be renewed in the instruction memory unit 31 by a store operation which results from either inside the data processing system or from outside. In this event, it may become necessary to update the branch history table 46. It therefore becomes mandatory to detect the store operation and to distinguish upon detection of the branch history table 46. This, however, requires undesirable increases in the amount of hardware.

An additional object of this invention is therefore to provide an instruction prefetching device which comprises a branch history table of the type described and is operable with a least possible increase in the amount of hardware to detect a store operation and to distinguish upon detection of the store operation between necessity and unnecessity of updating the branch history table.

It is to be noted in connection with the branch history table 46 that the branch information need not be always correctly predictive of the branch direction and the branch destination address. When a different branch instruction is substituted in the instruction memory unit 31 for an existing branch instruction, the predicted branch direction and/or the predicted branch destination address may merely become incorrect. This does not seriously disturb prefetch of an instruction sequence as described heretofore. A problem, however, arises when a branch instruction is renewed to an instruction which is not a branch instruction. Such a problem may also arise when the address translating table is renewed by the store operation with the result that the address information memorized in the branch history table 46 is assigned to an instruction which is other than the branch instruction.

An instruction prefetching device according to another embodiment of this invention is therefore accompanied by the above-mentioned branch instruction detector 73, which confirms whether or not any entry pair located in the branch history table 46 is really for a branch instruction. In other words, the branch instruction detector 73 is coupled to the branch history table 46 and the instruction memory unit 31 to produce a discrimination signal which indicates whether or rot the instruction to be prefetched with reference to the branch history table 46 is a branch instruction.

Prefetch of the instruction sequence is carried out by continuing the prefetch in compliance with the branch instruction produced by the branch history table 46 and by neglecting the branch information when the discrimination signal indicates that each prefetched instruction is and is not a branch instruction. More particularly, the instruction prefetch control unit 47 is additionally controlled by the discrimination signal as will later be described.

Figure 20:
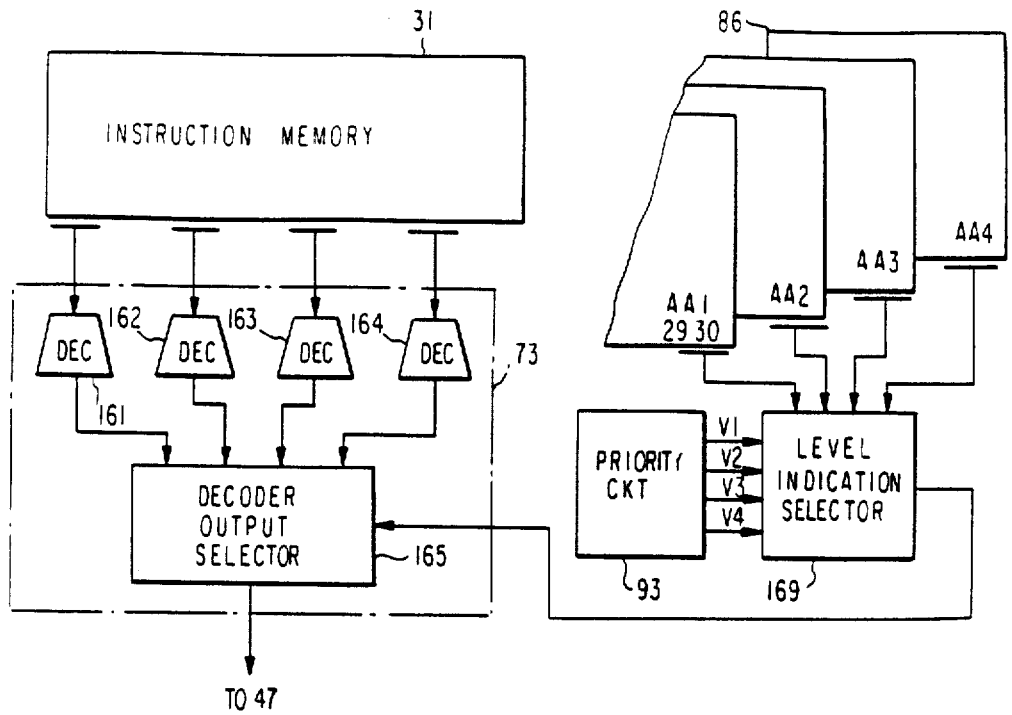
FIG. 20 shows in blocks a branch instruction detector for use in an instruction prefetching device according to another embodiment of this invention, together with associated circuitry.

Referring to FIG. 20, it will be assumed as described heretofore that the instruction memory unit 31 memorizes eight-byte instruction words and that each of the directory and the data memories 86 and 87 (FIG. 12) of the branch history table 46 has four levels which correspond to four two-byte instructions of each instruction word. The branch instruction detector 73 may comprise first through fourth branch instruction decoders 161, 162, 163, and 164 for decoding the operation codes of the four two-byte instructions to produce first through fourth decoder output signals. Each of the branch instruction decoders 161 through 164 is supplied with eight less-numbered bits of the two-byte instruction. The decoder output signals are delivered to a decoder output selector 165. Each decoder output signal takes the logic "1" and "0" levels when the two-byte instruction is or is not a branch instruction, respectively.

When the instruction word comprises a branch instruction, the address hit signal of the logic "1" level is produced from the level which corresponds in the directory memory 86 to the two-byte instruction comprised by the branch instruction. It is possible to discriminate the level by the twenty-ninth and thirtieth bits (:29, 30) produced by each level of the directory memory 86, which bits will now correctly be called a level indication signal. The branch history table 46 comprises a level indication selector 169 supplied with the level indication signals produced by the respective levels of the directory memory 86. Responsive to the first through fourth selection signals V1 to V4 (FIG. 14) of the priority circuit 93, the level indication selector 169 selects one of the level indication signals. The selected indication signal represents one of decimal values 0 through 3 which indicates first through fourth directory memory levels AAi's. The selected indication signal therefore indicates the directory memory level in which the address information is located by the current request address. Responsive to the selected indication signal, the decoder output selector 165 produces the discrimination signal. It will now be understood that the decoder output selector 165 selects the decoder output signal of the logic "0" level if the branch instruction is changed in the instruction memory unit 31 to an instruction which is not a branch instruction.

Figure 21:
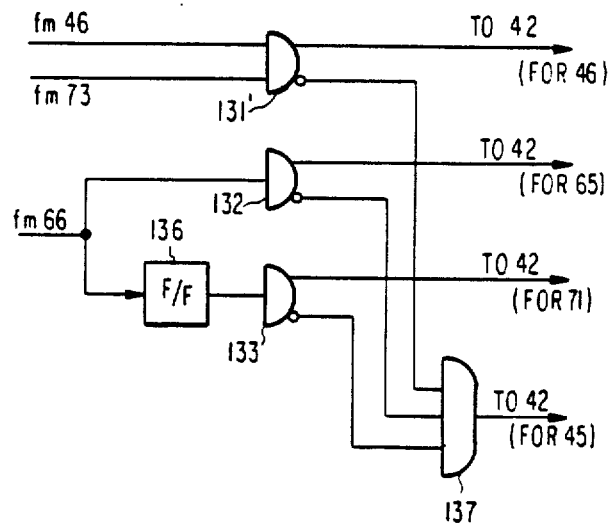
FIG. 21 is a block diagram of an instruction prefetch control unit for use in the instruction prefetching device mentioned in connection with FIG. 20.

Turning to FIG. 21, the instruction prefetch control unit 47 comprises similar parts designated by like reference numerals except that a two-input AND/NAND circuit 131' is substituted for the first true-false circuit 131. The AND/NAND circuit 131' is supplied with the address hit signal and additionally with the discrimination signal. When the discrimination signal takes the logic "0" level, the address hit signal is neglected so that prefetch is suspended.

What is claimed is:

1. An instruction prefetching device for use in carrying out prefetch of an instruction sequence in a data processing system which includes an executing unit and current instruction address means for specifying the address of a current instruction to be executed, wherein said executing unit executes the current instruction to obtain a result of execution, said instruction prefetching device comprising:

a branch history table for storing a plurality of entry pairs, each entry pair comprising a first entry specifying an instruction address of a branch instruction executed by said executing unit prior to said prefetch and a second entry specifying branch information which comprises a branch destination address obtained by execution of said branch instruction, said branch history table comprising a directory memory having a predetermined number of directory blocks for storing the first entries of said entry pairs and a data memory having a plurality of data blocks corresponding to respective ones of said directory blocks, said data blocks storing the respectively associated second entries of said entry pairs, said branch history table storing a plurality of entry pairs having first entries each specifying the same branch instruction address:

retrieving means coupled to said current instruction address means and responsive to a current instruction address for locating in said branch history table any first entries which specify the current instruction address as a branch instruction address and for retrieving an associated second entry from said branch history table when one of said first entries is located, said retrieving means comprising first means responsive to said current instruction address for locating in said branch history table any first entries which specify the current instruction address as a branch instruction address, second means for selecting a particular one of said located first entries when said located first entries are more than one, said selected first entry representing a selected instruction address for a branch instruction to be prefetched next, and third means responsive to said selected instruction address for selecting the second entry stored in the data block corresponding to the directory block storing said selected first entry; and prefetching means responsive to said selected second entry for carrying out said prefetch, said prefetching means comprising: prediction evaluating means responsive to said selected second entry and said result of execution for evaluating said selected second entry to produce a prediction evaluation signal indicative of whether the branch destination address of the branch information specified by said selected second entry is consistent or inconsistent with said result of execution; and controlling means coupled to said prediction evaluating means for determining when said prediction evaluation signal indicates that the branch destination address of the branch information specified by said selected second entry is consistent or inconsistent with said result of execution, and responsive to said prediction evaluation signal for controlling said prefetch to be continued in response to said selected second entry when said prediction evaluation signal indicates that the branch destination address of the branch information specified by said corresponding second entry is consistent with said result of execution and for controlling said prefetch to be continued in response to said result of execution when said prediction evaluation signal indicates that the branch destination address of the branch information specified by said selected second entry is inconsistent with said result of execution.

2. An instruction prefetching device as claimed in claim 1, wherein said controlling means comprises:
    means responsive to the prediction evaluation signal indicative that said branch destination address is consistent with said result of execution for continuing said prefetch;
    renewing means responsive to the prediction evaluation signal indicative that said branch destination address is inconsistent with said result of execution for renewing the branch information specified by said selected second entry to new branch information according to said result; and
    means responsive to said new branch information for carrying out said prefetch.

3. An instruction prefetching device as claimed in claim 1, wherein:
    said branch history table stores entry pairs in which the branch information specified by each second entry further comprises a designation of a branch direction obtained by execution of said branch instruction;
    said prediction evaluating means producing the prediction evaluation signal which additionally indicates whether the branch direction of the branch information specified by said selected second entry is consistent or inconsistent with said result of execution;
    said controlling means controlling said prefetch in response to said selected second entry when said prediction evaluation signal indicates that both of the branch destination address and the branch direction of the branch information specified by said selected second entry are consistent with said result of execution and for controlling said prefetch in response to said result when said prediction evaluation signal indicates that either of the branch destination address and the branch direction of the branch information specified by said selected second entry are inconsistent with said result of execution.

4. An instruction prefetching device as claimed in claim 3, wherein said controlling means comprises:
    means responsive to the prediction evaluation signal, indicative that both of the branch, destination address and the branch direction are consistent with said result of execution, for continuing said prefetch;
    first renewing means responsive to the prediction evaluation signal indicative that said branch direction is inconsistent with said result of execution for renewing the branch direction to a new branch direction according to said result;
    second renewing means responsive to the prediction evaluation signal indicative that the branch destination address is inconsistent with said result of execution for renewing the branch destination address to a new branch destination address according to said result; and
    means responsive to said new branch direction and said new branch destination address for carrying out said prefetch when said first and said second renewing means are put into operation, respectively.

5. An instruction prefetching device as claimed in claim 1, said executing unit including an address translating circuit for translating a logical address to a real address, wherein said branch history table stores the entry pairs in which the first entry indicates a real address of said branch instruction and in which the branch information specified by the corresponding second entry indicates a real branch destination address obtained by execution of said branch instruction.

6. An instruction prefetching device as claimed in claim 1, further comprising:
    discriminating each prefetched instruction to produce a discrimination signal which indicates whether or not each prefetched instruction is a branch instruction; and
    controlling means responsive to said discrimination signal for causing said prefetching means to ignore said corresponding second entry when said discrimination signal indicates that each prefetched instruction is not a branch instruction.

7. An instruction prefetching device for use in carrying out prefetch of an instruction sequence in a data processing system which includes an executing unit and current instruction address means for specifying the address of a current instruction to be executed, said address including first and second address parts, said instruction prefetching device comprising:
    a branch history table for storing a plurality of entry pairs, each entry pair comprising a first entry specifying a branch instruction address of a branch instruction executed by said executing unit prior to said prefetch, each said branch instruction address including first and second parts, and a second entry specifying branch information which comprises a branch destination address obtained by execution of said branch instruction, said branch history table comprising a directory memory having a plurality of directory memory sections for storing the first entries of said entry pairs and a data memory having a plurality of data memory sections for storing the respectively associated second entries of said entry pairs;

first means coupled to said current instruction address means and responsive to said first part of said current instruction address for locating in said directory memory any first entries which specify the current instruction address as a branch instruction address and for providing the located first entries as first branch instruction address outputs and for providing the second entries respectively associated with said located first entries as potential branch destination address outputs from said data memory;

second means for comparing the second part of said current instruction address with the second part of each first branch instruction address output to select as potential branch instruction addresses those first branch instruction address outputs representing potential branch instructions for said current instruction;

third means for examining the second address part of each potential branch instruction address and for selecting a highest priority branch instruction address in accordance with the results of said comparison;

fourth means for selecting one of said potential branch destination addresses in accordance with the output of said third means; and prefetching means responsive to said selected potential branch destination address for carrying out said prefetch.

8. An instruction prefetching device for use in carrying out prefetch of an instruction sequence in a data processing system which includes an executing unit and an instruction address register for storing the address of a current instruction to be executed and for providing said address as an output, said instruction prefetching device comprising:

an instruction buffer for storing plural instruction words each containing a plurality of instructions and for providing one of said instructions as an output in response to said instruction address register output;

a branch history table for storing a plurality of entry paris, each entry pair comprising a first entry specifying an instruction address of a branch instruction executed by said executing unit prior to said prefetch and a second entry associated with said first entry and specifying branch information which comprises a branch destination address obtained by execution of said branch instruction;

selector means for receiving plural instruction addresses as inputs and responsive to a selection control signal for providing one of said instruction addresses as an output to said instruction address register, one of said plural instruction addresses comprising a second entry provided from said branch history table;

selection control means for providing said selection control signal to said selector means, said selection control means including means for detecting if the first entry associated with the second entry currently being provided by said branch history table to said selector means designates the address of a branch instruction and, if not, for controlling said selector means not to select said second entry, said selection control means comprising: decoder means for determining, with respect to each instruction contained in an instruction word, whether that instruction is a branch instruction or not; position determining means for determining, with respect to each first entry in said branch history table, the position of the instruction designated by said first entry in its respective instruction word; and means responsive to said position determining means and to said decoder means for determining if said current instruction is a branch instruction.

* * * * *